Nov. 7, 1939.  A. MARTIN  2,179,128
MACHINE FOR MAKING PLASTER GROUND
Filed June 10, 1938   5 Sheets-Sheet 2

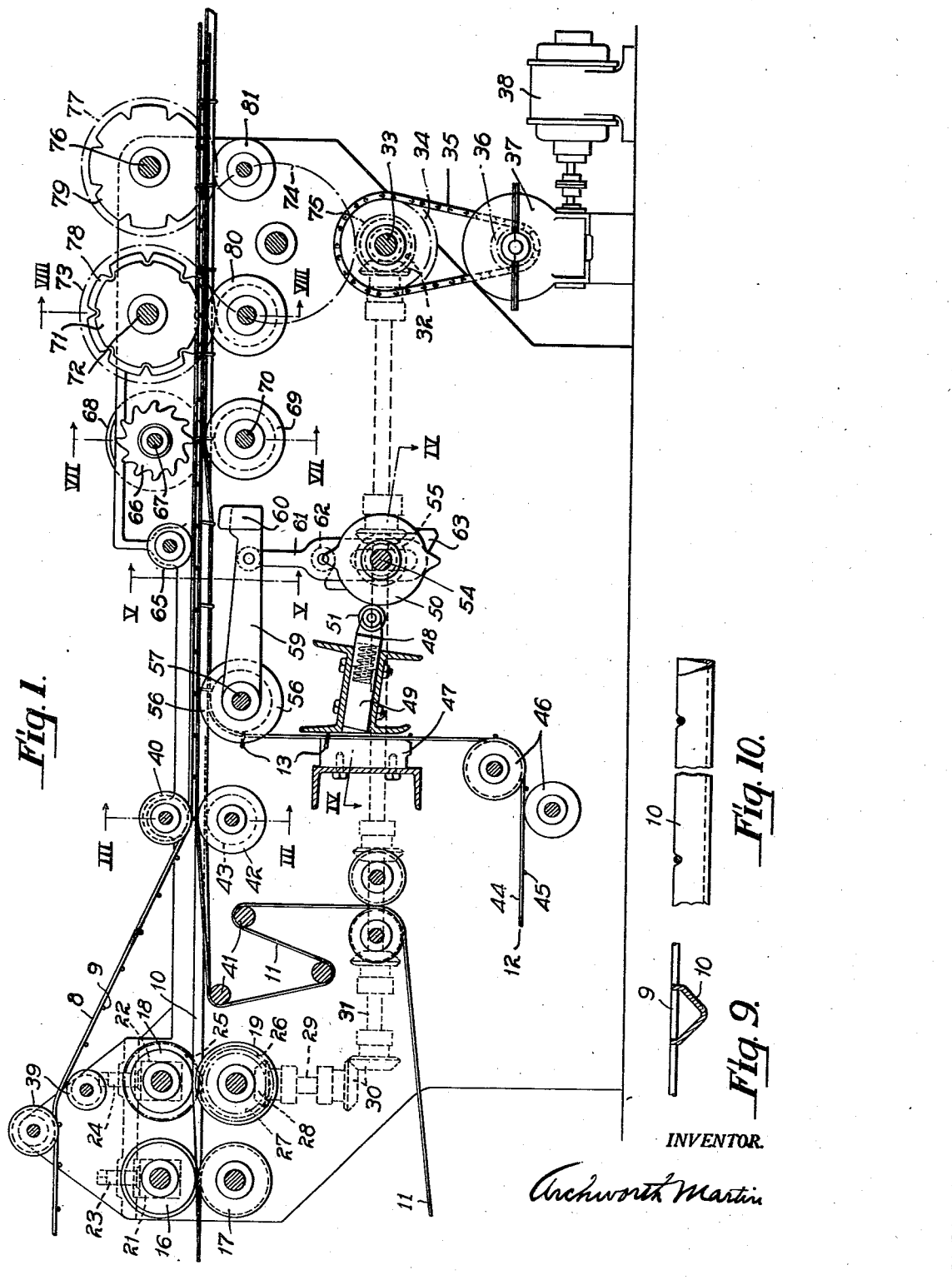

INVENTOR.
Archworth Martin

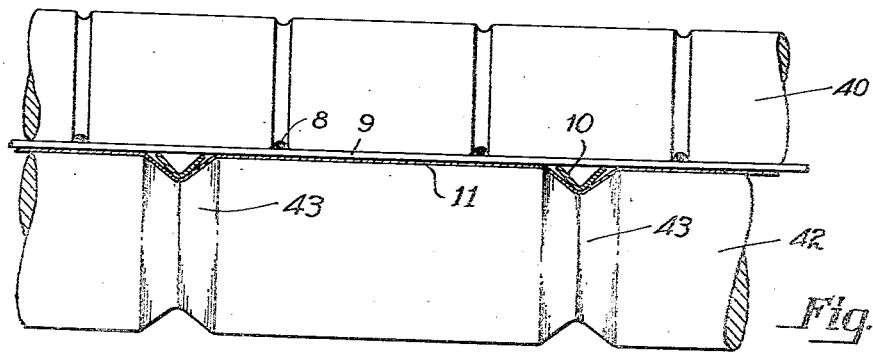
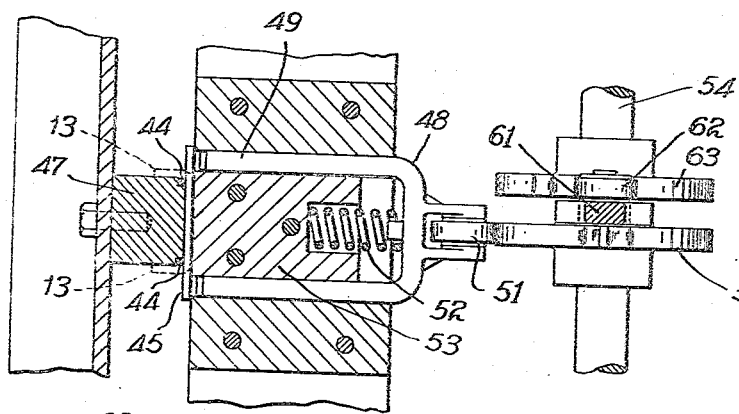
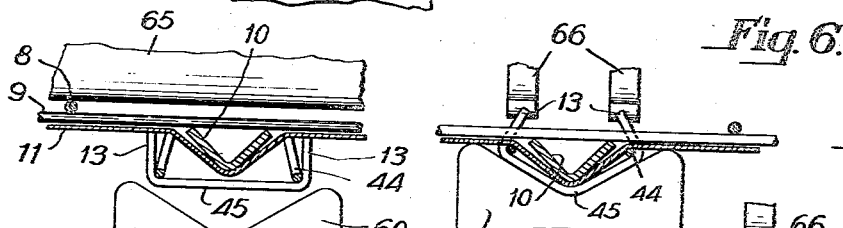
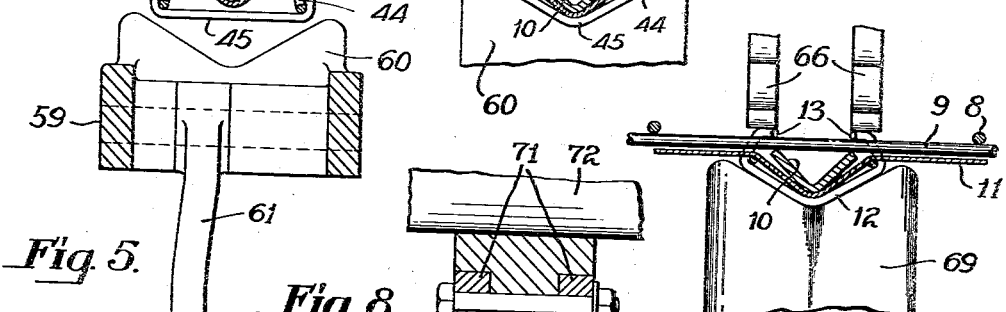
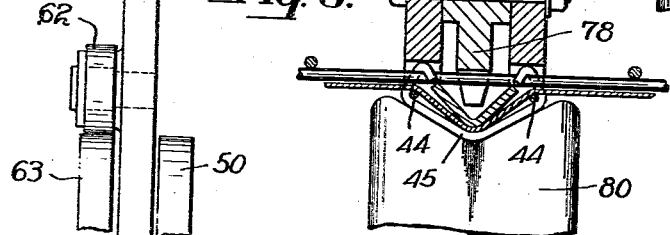

Nov. 7, 1939.   A. MARTIN   2,179,128
MACHINE FOR MAKING PLASTER GROUND
Filed June 10, 1938   5 Sheets-Sheet 4
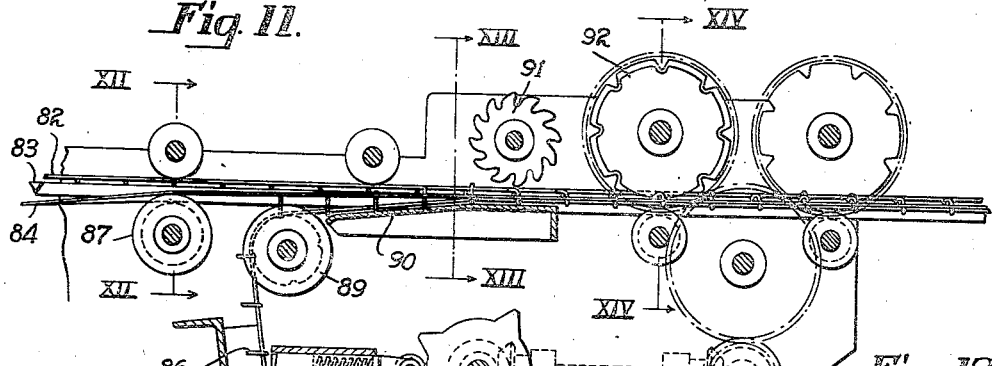
Fig. 11.
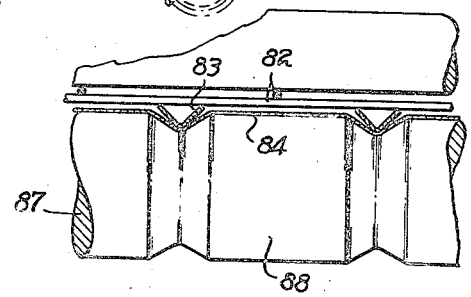
Fig. 12.
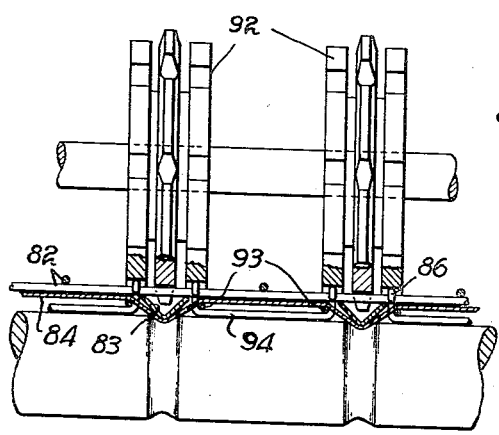
Fig. 13.
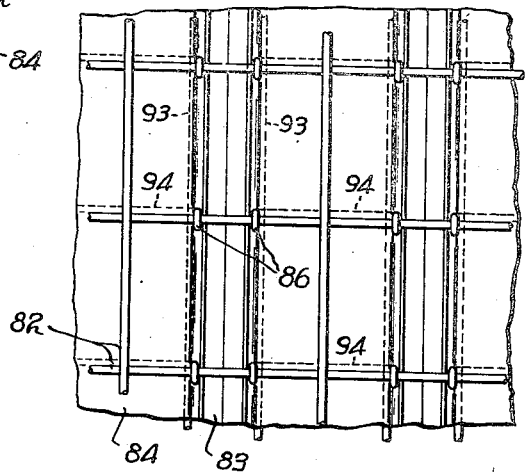
Fig. 15.
Fig. 14.
INVENTOR.
Archworth Martin

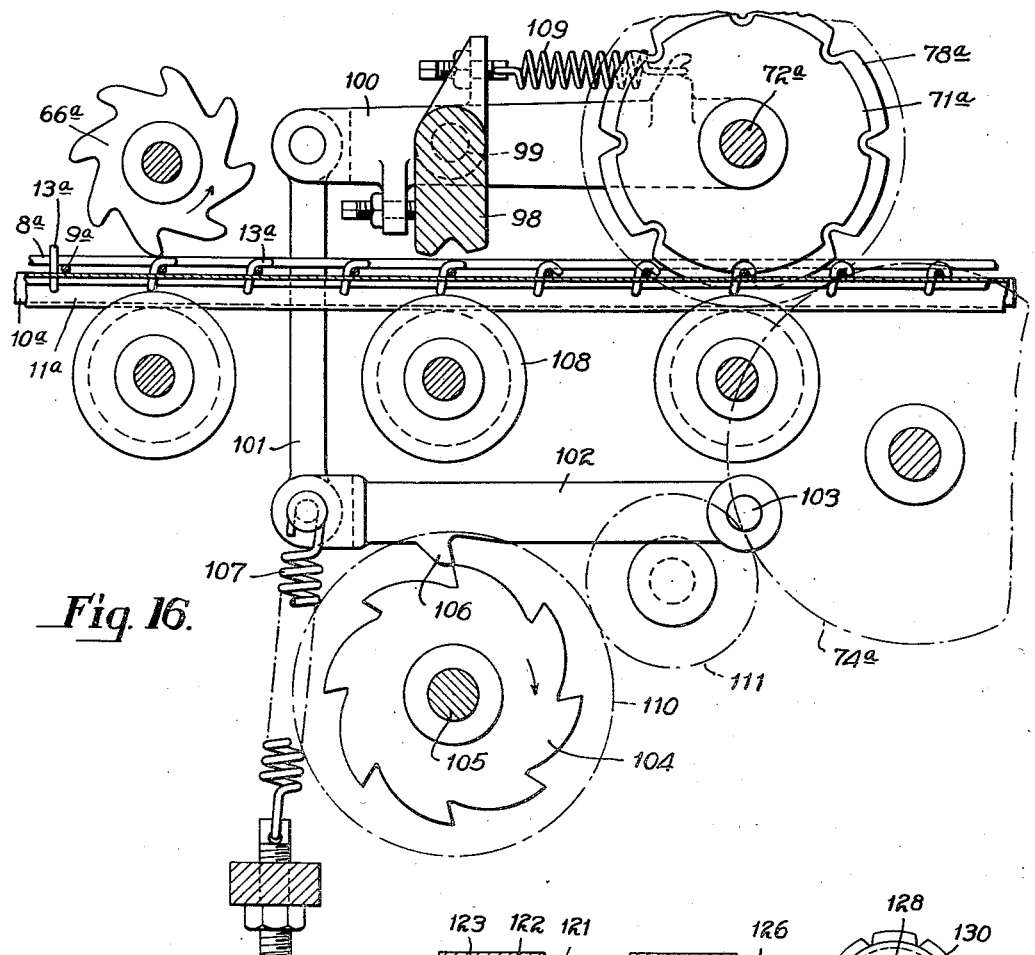
Fig. 16.
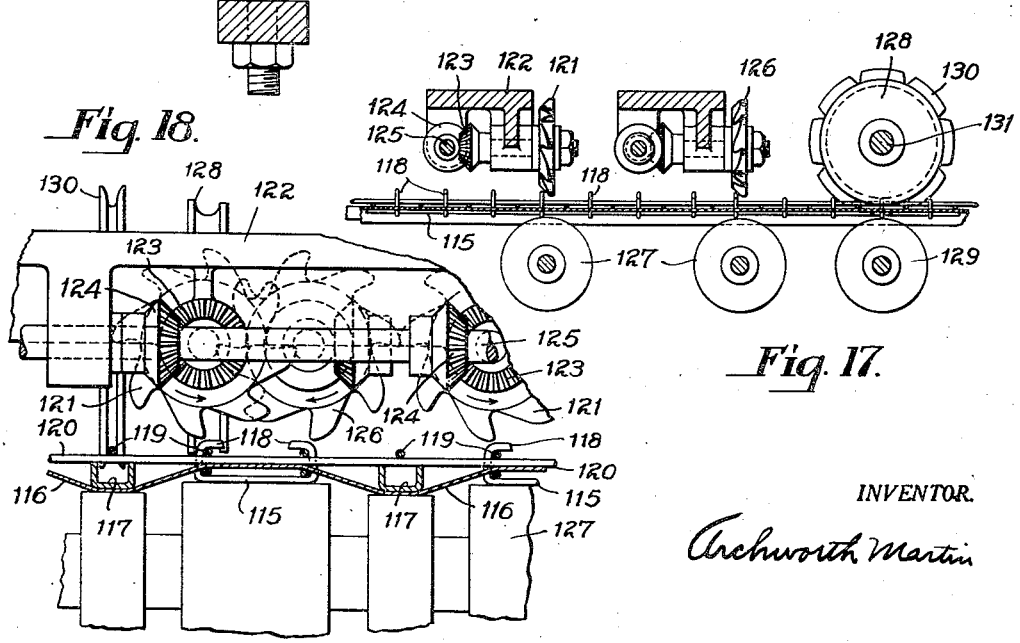
Fig. 18.
Fig. 17.
INVENTOR.
Archworth Martin

Patented Nov. 7, 1939

2,179,128

UNITED STATES PATENT OFFICE 2,179,128

MACHINE FOR MAKING PLASTER GROUND

Archworth Martin, Pittsburgh, Pa.

Application June 10, 1938, Serial No. 213,088

13 Claims. (Cl. 1—2)

My invention relates to composite fabric structures and machines for making the same, and comprises reinforcement mesh for plastic material such as concrete, plaster or the like, together with a backing or form sheet of paper or the like therefor.

While the invention is herein disclosed as employed in the making of ribbed structures wherein the composite fabric is stiffened to facilitate the installation thereof and to resist trowel pressure during application of the plaster or concrete, and to provide for thickened ribs of plaster in the completed structure, various features thereof can be employed in the making of unribbed fabric structures.

One object of my invention is to provide means for connecting stiffening ribs to the fabric structure, without the necessity of welding the ribs in place or employing special clip wires or staples therefor.

Another object of my invention is to provide means for applying strips for connecting the backing sheet to the mesh, in such manner that the sheet is supported very firmly over extended areas and a lighter weight paper can be employed than has been heretofore deemed necessary.

Another object of my invention is to apply said tie strips in such manner that the fabric structure as a whole will have sufficient strength even though lighter gauge reinforcing mesh is used than has heretofore been deemed necessary.

Another object of my invention is to provide an improved means for applying tanged tie strips, whereby little or no difficulty will be experienced in causing the tangs to be projected through the paper in proper position to be bent over elements of the reinforcing mesh.

Another object of my invention is to provide an improved means for snugly applying a backing sheet against the rear side of a ribbed reinforcing mesh.

Still another object of my invention is to provide a plaster ground or fabric structure of generally improved form, whereby the manufacture of the fabric is facilitated.

A further object of my invention resides in the provision of a fabric forming machine of generally simplified and improved form.

Some of the forms which my invention may take are shown in the accompanying drawings wherein Figure 1 is a longitudinal sectional view through the machine; Fig. 2 is a plan view thereof, with some parts broken away; Figs. 3, 4 and 5 are enlarged views taken on the lines III—III, IV—IV and V—V, respectively, of Fig. 1; Fig. 6 is a view similar to Fig. 5 but showing the parts in a different operative position; Figs. 7 and 8 are views taken on lines VII—VII and VIII—VIII, respectively, of Fig. 1; Figs. 9 and 10 are cross sectional and longitudinal views, respectively, showing a form of reinforcing bar or rib which may be employed in the fabric structure produced by the machine of Fig. 1; Fig. 11 is a longitudinal sectional view showing a modification of a portion of the structure of Fig. 1; Figs. 12, 13 and 14 are enlarged views taken on the lines XII—XII, XIII—XIII and XIV—XIV, respectively, of Fig. 11; Fig. 15 is a plan view of a portion of the finished fabric formed on the machine of Fig. 11; Fig. 16 is a fragmentary longitudinal sectional view on an enlarged scale, showing another modification of the apparatus of Fig. 1; Fig. 17 is a similar view showing still another modification, and Fig. 18 is a fragmentary transverse sectional view of the structure of Fig. 17.

Generally, the fabric structure comprises a metallic reinforcement, stiffening ribs therefor, a backing sheet and tanged tie strips by means of which the fabric elements are held in assembled relation. The fabric assembly produced by the machine disclosed in Figs. 1 to 8, comprises a reinforcement here shown as a wire mesh having strand wires 8 to which are welded cross or stay wires 9. It will be understood that other forms of mesh such as expanded metal or woven or twisted mesh could be employed. The fabric structure includes also a series of laterally spaced reinforcing metallic ribs 10 which may be formed of sheet metal, a backing or form sheet 11 and tie strips 12, which have tangs 13 that are projected through the paper and bent over certain of the mesh wires to hold the sheet, the mesh, the ribs 10 and the backing sheet 11 in assembled relation. All of the foregoing elements are drawn from suitable sources of supply such as reels, and are continuously advanced, the tangs 13 being projected through the paper and bent during such advancing movement.

The stiffening or rib members 10 are each formed from ribbon-like strips of metal, the bending from flat to V form being effected by pairs of rollers 16 and 17, the rollers 17 being provided with peripheral grooves of V form and their respective cooperating rollers 16 having peripheral ribs of V form. The ribs are only partially bent at this point. Additional forming rolls 18 and 19 are provided, which respectively have V ribs and grooves to give the strips their final contour. With light metal one pair of V forming rolls will be sufficient for each strip. The rollers 16, 17, 18 and 19 are secured to shafts which are journalled in the framework of the machine. The shafts for the rollers 16 and 18 are supported in vertically adjustable or movable bearings 21 and 22 respectively, which are held down to a desired point or with a desired degree of pressure by screws 23 and 24.

The shafts for the rollers 18 and 19 carry intermeshing gears 25 and 26, the shaft on which the gear 26 is mounted having a bevel gear wheel 27 that is driven from a bevel gear wheel 28 whose shaft 29 is driven through bevel gearing 30 from a shaft 31. The shaft 31 is driven through bevel gearing 32 from a shaft 33. The shaft 33 carries a sprocket 34 that is driven by a chain 35 from a sprocket wheel 36, that is in turn driven from speed-reducing mechanism 37 which has driving connection with a motor 38.

The mesh is drawn past guide rolls 39 which are positioned above the bending rolls 16, 17, 18 and 19 and beneath a guide roller 40 which brings it into parallelism with the stiffening strips 10. The backing sheet 11 is drawn past tensioning and guide rolls 41 and above a grooved presser roll 42 that extends the width of the machine and has peripheral grooves 43 which match with the ribs 10 and press the paper snugly against the mesh, as shown more clearly in Fig. 3. Thus, the stiffening ribs 10 with the mesh 8—9 at one side of the plane of travel thereof and the backing sheet 11 at the other side are continuously moved forward. During such traveling movement they are permanently attached by the tie strips 12.

The tie strips 12—one for each longitudinal rib 10—of the form shown more clearly by full lines in Fig. 4, are formed of longitudinally-extending wires 44 to which are welded cross wires 45. These strips may suitably be formed by cutting or slitting sheets of welded mesh.

The tie strips 12 are drawn past guide rollers 46 and past tang-bending mechanisms each having an anvil member 47 and a bending member 48. The bending member 48 has legs 49 which are pressed into engagement with the projecting ends of the cross wires 45 to bend them from the full line positions of Fig. 4 to the dotted line positions, thereby forming the tangs 13. The member 48 is periodically projected toward its anvil 47 by a cam 50 which operates against a cam roller 51. A spring 52 interposed between the member 48 and a stationary guide block 53 serves to maintain the roller normally against the face of the cam 50. As shown more clearly in Fig. 1, the bending members 48 are inclined with relation to the plane of the tie strips, so that when they are projected forwardly during travel of the strips, the tangs 13 will be slightly inclined in a forward direction, and when the strips are brought into parallelism with the sheet and the mesh, the extremities of the tangs will be slightly in advance of the stay wires 9 and, therefore, there will be less danger of the tangs being projected directly against the stays or behind the same. The cams 50 are mounted on a cross shaft 54 which has bevel gear connection at 55 with the shaft 31.

The spacing of the tangs 13 longitudinally of the tie strips is a multiple of the spacing of the stay wires 9, so that each set of tangs will be in position to be bent backwardly over stay wires by means to be hereinafter described. By canting or inclining the tangs 13 slightly forward, they will be projected through the paper in advance of adjacent stay wires 9. The tie strips 13 are drawn across guide rollers or sheaves 56 and thereby brought into parallelism with the sheet 11 and the mesh in underlying relation relative to the ribs 10. The sheaves are loosely mounted on a cross rod 57. As shown more clearly in Fig. 5, the tangs 13 of each tie strip straddle a stiffening bar 10.

Yokes 59 are mounted at one end upon the rod 47 and have presser heads 60 which are periodically moved upwardly to push the tangs through the backing sheet and the mesh and to bend the cross wires 45 of the tie strips from the position shown in Fig. 5 to that shown in Fig. 6, thereby bringing the longitudinal wires 44 into position to snugly maintain the backing sheet against the stiffening bars 10 and the mesh. The yokes 59 are oscillated vertically by links 61 which carry a cam roller 62 that bears against cams 63, which are mounted on the shaft 54. The lower ends of the links 61 are bifurcated to form legs which straddle the shaft 54 and serve as guides for the links.

Substantially opposite the presser heads 60 is a roller 65 which maintains the mesh and the paper against deflection upwardly when the presser heads are pushing the tangs through the sheet.

After the tangs are pushed through the sheet, they pass toothed discs or wheels 66 which are secured to a shaft 67 that is driven at a high rate of speed from a motor 68, in a clockwise direction, so that the teeth of the wheel 66 will bend the upper ends of the tangs back across the adjacent stay wires 9. Back-up rollers 69 mounted on a shaft 70 support the tie strips against deflection under the impacts of the toothed wheels 66. When the tangs have been initially bent by the toothed wheels 66, they pass beneath bending discs 71 which have semi-circular recesses in their peripheries, positioned to engage the partially bent tangs and clench them around the stay wires 9. The discs 71 are secured to a shaft 72, which carries a gear wheel 73, that meshes with a gear wheel 74 which in turn meshes with a pinion 75 that is mounted on the shaft 33. Forwardly of the shaft 72 is a second shaft 76 which carries a gear 77 which meshes with the gear wheel 74. The shafts 72 and 76 are provided with sprocket-like wheels 78 and 79 which are arranged to engage the cross wires 9 of the mesh and assist to advance the fabric structure through the machine. The driving members 78 have their teeth circumferentially offset with respect to the teeth of the sprockets 79, so that when the fabric is being drawn by one series of sprocket wheels, the other series is moving toward driving engagement with cross wires and will have full driving engagement therewith at the time the first-mentioned series is passing out of engagement with a preceding cross wire. Supporting rollers 80 are provided beneath the bending discs 71 to support the tang strip and the fabric against deflection under the bending pressure, and idling rollers 81 similarly hold the mesh against the discs 79.

The bending of the tie strips to the positions shown in Figs. 6 to 8 causes them to firmly connect the stiffening ribs 10 to the mesh and, as heretofore stated, the longitudinal members 44 of the tie strips hold the paper snugly in position and in effect form continuous supports for the paper throughout the full length of the fabric structure. The paper is not only supported in a taut condition, but also is supported against tearing through the pressure imposed thereon when applying the plaster to the mesh.

If desired, the ribs 10 can be notched at intervals, as shown more clearly in Figs. 9 and 10, the notches being positioned to receive the stay wires 9 to thereby more firmly hold the ribs against shifting in a longitudinal direction. It will be understood that stiffening ribs of other cross-sectional forms than the V-form shown herein could be employed, and that the assembled fabric structure as it comes from the machine will be cut into suitable lengths.

In this form of fabric structure, extremely light gauge wire mesh or netting and a light weight paper backing can be employed, since the ribs 10 are not welded to the mesh but are connected thereto by the back-up tie strips. Thus, the amount of metal and the weight of a given unit of fabric can be materially lessened without sacrifice of reinforcing strength, thereby reducing considerably the cost of the fabric.

Referring now to Figs. 11 to 14, I show a structure wherein the mesh 82, the stiffening ribs 83, the backing sheet 84 and the tie strips 85 are drawn from suitable sources of supply as in the structure of Fig. 1. In this form of apparatus the said fabric members are advanced in substantially the same manner as in the other form, and the tangs 86 are formed and bent in the same manner. However, in this form of structure, the tang strips 85 are positioned between the stiffening ribs 83 instead of having embracing relationship therewith.

As the backing sheet 84 approaches the plane of the mesh 82, it passes over a roll 87 that has peripheral grooves opposite the ribs 83, and the intermediate ungrooved portions 88 of the roll deflect the paper upwardly between the stiffening ribs 83, as shown more clearly in Fig. 12. When the sheet has passed the roller 87, it is engaged by the tangs 86 which move over a guide roller or sheave 89 and along an inclined guide plate 90. During this travel of the tie strips, the tangs are forced through the sheet into position to be bent backwardly by the toothed wheels 91 and clenched by the discs 92, which members correspond to the members 66 and 71 of Fig. 1. Also, the longitudinally-extending strand wires 93 of the tie strips are firmly pressed against the paper just previous to the bending of the tangs and, therefore, force the paper upwardly into engagement with the under side of the mesh, as shown in Fig. 13, thus placing the paper under tension. The ribs are thereby snugly held in position against the rear side of the mesh by the paper which is thus held in a taut condition.

As shown more clearly in Figs. 14 and 15, the ribs 83 are confined between adjacent tie strips 85 and held against the mesh 82 by the backing sheet 84, the longitudinally-extending wires 93 of the tie strips being disposed in proximity to the edges of the ribs 83 and forming continuous supports for the sheet 84 throughout the full length of the fabric. When plastic material is applied to the fabric, the transverse members 94 of the tie strips back up and support the sheet 84 against excessive deflection.

As shown more clearly in Fig. 16, mesh 8a—9a, the ribs 10a and the backing sheet 11a may be brought into parallelism substantially in the same manner as shown in Fig. 1. But in this instance the tangs 13a are projected through the paper and the mesh behind the stay wires 9a instead of in front of them, and need not be canted or forwardly inclined. The notched wheels 66a, which correspond to the notched wheels 66, are, however, driven rapidly in a counter-clockwise direction, that is, they operate in the direction of travel of the fabric, to bend the tangs forwardly.

The forwardly bent tangs are clenched by a bending die 98 which is in the form of a bar that extends transversely of the machine and is notched on its underside. The ends of the bar 98 have trunnion-like extensions 99 which are pivotally supported in rocker arms 100, at each side of the machine. The arms 100 at their forward ends are pivotally supported on a shaft 72a. The rear ends of the arms 100 are pivotally connected to links 101, the lower end of the links being pivotally connected to levers 102, whose forward ends are pivotally supported at 103 in the framework of the machine.

Cam wheels 104 are secured to a shaft 105 and have camming surfaces that engage a cam shoulder 106 on the levers 102, to periodically raise said levers and the rocker arms 100. As the camming surfaces on the cams 104 pass from beneath the shoulders 106, a spring 107 will move the arms 100 and the bending die 98, thereby bringing it down with a snap movement to clench the tangs 13a. A back-up roller 108 supports the tang strips and the fabric during this clenching operation, it being understood that the fabric is continuously moving during the said operations. The pivotal mounting of the bending die at 99 permits it to rock and its lower side to have slight advancing movement with the fabric. A spring 109 which is connected to the upper edge of the die 98 and to a lug on one of the rocker arms 100, serves to return the bending die to its initial position after each rocking movement. The said forward movement of the bending die results from its engagement with the tangs and the die will be returned to its initial position as soon as a clenched tang has passed out of engagement therewith, this separation occurring at some point during the arcuate path of movement of the die. It will be understood that simultaneously with the forward rocking movement of the die, the cam 104 will begin to raise the die to assist in clearing it from the clenched tangs and to position it for impacting movement against the succeeding tangs under the snap action of the springs 107. The fabric is advanced by discs 78a, which correspond to the discs 78, and discs 71a can be provided for additionally clenching the tangs.

The shaft 105 carries a gear wheel 110 which is driven by a gear wheel 111 that meshes with a gear wheel 74a, which corresponds to the gear wheel 74 of Fig. 1.

In Figs. 17 and 18 I show an arrangement whereby the tangs are bent over the longitudinally-extending mesh wires instead of over the transverse or stay wires, by bending or clenching elements that rotate on axes parallel to the path of travel of the fabric. In this form of apparatus, the mesh, the backing sheet and the tang strips are brought into parallelism, with the tangs projecting through the paper and the mesh in a suitable manner, as for example, by apparatus such as shown in Figs. 1 and 11. The tie strips 115 are disposed against the rear side of the backing sheet 116 and between adjacent stiffening ribs or channels 117, somewhat as in Figs. 11 and 13, but in this form the prongs or tangs 118 of each tie strip are disposed in close proximity to strand wires 119 of the reinforcing mesh. The tie strips may be cut from sheets of welded mesh whose members have the same spacing as the reinforcement mesh, the tie strips being longitudinally offset slightly with respect to the reinforcement mesh, so that the tangs 118 will extend between the stay wires 120 of the reinforcement mesh. The stiffening bars 117 may simply be held in place by the backing sheet 116 that is tensioned by the tie strips, particularly if heavy paper is employed, or it may be embraced by and attached to the reinforcement mesh by the tie strip 115 or held against longitudinal shifting by notching the edges thereof as in the case of the stiffening bars of Figs. 9 and 10.

Two series of bending elements are provided, one for bending tangs at one edge of each tie strip in one direction, over a strand wire 119, and the other series for bending the other tangs in the opposite direction about an adjacent strand wire, as indicated in Fig. 18. The bending elements are in the form of toothed wheels, one set of these wheels 121 being mounted on short shafts journalled in a cross bar 122 that extends transversely of and is secured to the framework of the machine. The shafts for the toothed wheels 121 are each provided with a bevel gear wheel 123 that meshes with a gear wheel 124 that is secured to a shaft 125 journalled in brackets carried by the bar 122. The shaft 125 may be driven by a separate motor, as in the case of the shaft 67. The wheels 121 will be rotated quite rapidly to bend the tangs during advancing movement of the mesh. The series of toothed bending wheels 126 which bend tangs in a direction opposite to that in which the wheels 121 bend them, is mounted and driven in the same manner as the wheels 121, but is rotated in a direction opposite to that in which wheels 121 are driven. Back-up or supporting rollers 127 are provided for supporting the fabric against deflection during said tang bending operations.

The tangs are more completely bent or clenched around the strands 119 by grooved rolls 128, the grooves being of approximately semi-circular form and, therefore, serving to bend the tangs into closely embracing engagement with the strand wires as the fabric passes between the rolls 128 and a supporting roller 129. Sprocket-like wheels 130 are secured to the shaft 131 which carries the bending rolls 128, the wheels 130 being notched at intervals for driving engagement with the stay wires 120 to effect advancement of the fabric through the machine. The shaft 131 corresponds to and is driven in a manner similar to the shaft 72 of Fig. 1.

From the foregoing it will be apparent that I have provided a fabric structure of such form that a light weight paper can be employed successfully since it will be supported over extended areas by the tie strips. Also, not only can a reinforcement mesh composed of a smaller or lighter gauge wire or light weight expanded metal be employed than has heretofore been deemed practical, but inexpensive types of wire screening or netting of coarse mesh, such as chicken wire netting can be used satisfactorily, since the stiffening ribs may be formed from a heavier ribbon or else the number of lighter ribs for a given width of fabric may be increased. In either event, the total amount of metal incorporated in the fabric will be materially lessened while the structure as a whole will have sufficient strength where a light weight composite fabric is desired. Since it is not necessary to weld the ribs to the fabric reinforcement, danger of burning light gauge reinforcement is eliminated and the rate of fabrication correspondingly increased.

The lighter weight paper referred to may be in the neighborhood of 60 lb. or 80 lb. paper, while the heavier paper may suitably be from 120 lb. to 200 lb.

I claim as my invention:

1. The combination with means for imparting advancing movement to reinforcement mesh and a backing sheet, together with longitudinally-extending ribs disposed between the mesh and the sheet, of apparatus for connecting the sheet to the mesh, comprising means for deflecting the sheet and pressing it against the mesh, at points between the ribs, means for applying to the rear side of the sheet tie strips having longitudinally-extending strands and perpendicularly-extending tang elements, with the said strand elements disposed in proximity to the sides of the ribs and against the deflected portions of the sheet, with the tang elements projecting through the sheet and the mesh, and means for bending the tang elements across certain of the mesh elements.

2. The combination with means for imparting advancing movement to reinforcement mesh and a backing sheet, together with longitudinally-extending ribs disposed between the mesh and the sheet, of apparatus for connecting the sheet to the mesh, comprising means for deflecting the sheet and pressing it against the mesh, at points between the ribs, means for applying to the rear side of the sheet tie strips each having a pair of longitudinally-extending strands and perpendicularly-extending tang elements, with the said strand elements disposed in proximity to the sides of the ribs and against the deflected portions of the sheet, with the tang elements projecting through the sheet and the mesh, and means for bending the tang elements across certain of the mesh elements.

3. The combination with means for imparting advancing movement to reinforcement mesh and a backing sheet, together with longitudinally-extending ribs disposed between the mesh and the sheet, of apparatus for connecting the sheet to the mesh, comprising means for deflecting the sheet and pressing it against the mesh at points between the ribs, means for applying to the rear side of the depressed portions of the sheet tie strips each having a pair of longitudinally-extending strands connected by tang elements which extend perpendicularly to the strip, with the tang elements projecting through the sheet and the mesh, and means for bending the tang elements across certain of the mesh elements.

4. The combination with means for imparting advancing movement to reinforcement mesh and a backing sheet, together with longitudinally-extending ribs disposed between the mesh and the sheet, of apparatus for connecting the sheet to the mesh, comprising means for deflecting the sheet and pressing it against the mesh at points between the ribs, means for applying longitudinally-extending tie strips against the rear side of the sheet along lines adjacent to the angles formed between the ribs and the mesh, and means for connecting said strips to the mesh.

5. The combination with means for imparting advancing movement to reinforcement mesh and a backing sheet, of means for striking up tang elements from a tie strip in a direction forwardly inclined relative to the longitudinal axis of the strip, means for forcing the tang elements through the sheet and the mesh at points immediately in front of mesh elements that extend crosswise of the path of advancing movement, and means for bending said tang elements backwardly over said mesh elements.

6. The combination with means for imparting advancing movement to reinforcement mesh and a backing sheet, of means for applying a tanged tie strip to the rear side of the sheet and forcing its tangs through the sheet and the mesh, elements rotatable on axes parallel to the path of advancing movement, for bending the tangs sidewise over certain mesh elements during advancing movement of the mesh and the sheet, and means for thereafter clenching the tang elements during said advancing movement.

7. The combination with means for imparting advancing movement to reinforcement mesh and a backing sheet, of means for applying a tanged tie strip to the rear side of the sheet and forcing its tangs through the sheet and the mesh, elements rotatable on axes parallel to the path of advancing movement, for bending certain of said tangs sidewise in one direction over the mesh, and other elements rotatable on axes parallel to the path of advancing movement, for bending other tangs sidewise in the opposite direction over the mesh.

8. The combination with means for imparting advancing movement to reinforcement mesh and a backing sheet, together with longitudinally-extending ribs disposed between the mesh and the sheet, of means for connecting the sheet to the mesh, comprising means for advancing a tie strip composed of longitudinally-extending strand members carrying transversely-extending stay members whose ends project laterally from the strand members, means for bending said projecting ends in a direction generally perpendicular to the plane of the strip, to form tangs, means for forcing said tangs through the paper and the mesh, and means for bending the said tangs across certain of the mesh elements.

9. The combination with means for imparting advancing movement to reinforcement mesh, a backing sheet and longitudinally-extending stiffening members disposed between the mesh and the sheet, and spaced apart in lateral directions, of means for applying tie strips to the rear side of the sheet in underlying relation to the said stiffening members, said tie strips having tang elements along each edge thereof; means for bending the tie strips about their longitudinal axes, to partially embrace the stiffening members and for projecting the tangs through said sheet, and said mesh, and means for bending the projected tangs into parallelism with the plane of the mesh.

10. The combination with means for imparting advancing movement to reinforcement mesh, a backing sheet and longitudinally-extending stiffening members disposed between the mesh and the sheet and spaced apart in lateral directions, of means for deflecting the sheet toward the mesh at points between adjacent stiffening members, means for applying longitudinally-extending tie strips to the rear side of the sheet, in underlying relation to the said stiffening members, and means for connecting said tie strips to the mesh.

11. The combination with means for imparting advancing movement to reinforcement mesh, a backing sheet and longitudinally-extending stiffening members disposed between the mesh and the sheet and spaced apart in lateral directions, of means for deflecting the sheet toward the mesh at points between adjacent stiffening members, means for applying longitudinally-extending supporting members against the rear side of the deflected portion of the sheet in proximity to the sides of the stiffening members, and means for connecting said supporting members to the mesh.

12. The combination with means for imparting advancing movement to reinforcement mesh, a backing sheet and longitudinally-extending stiffening ribs disposed between the mesh and the sheet, and spaced apart in lateral directions, of means for deflecting the sheet toward the mesh along lines disposed in proximity to the edges of the ribs, means for applying tie strips having perpendicular tang elements along each edge thereof, against the rear side of the sheet, with the tang elements projecting through the sheet in proximity to the edges of the ribs, and means for bending said tang elements into parallelism with the plane of the mesh.

13. The combination with means for imparting advancing movement to a reinforcement mesh having ribs extending longitudinally thereof and to a backing sheet disposed against the ribs, of means for simultaneously advancing tie strips, each composed of longitudinally- and transversely-extending wires, with the ends of the transverse wires projecting laterally of the longitudinal wires, means for bending the projecting ends of said transverse wires perpendicularly to the plane of the tie strips, to form tangs, means for forcing said tangs through the backing sheet and said mesh, at points adjacent to the edges of said ribs, and means for bending the tangs into overlying relation with said mesh.

ARCHWORTH MARTIN.